United States Patent
Kamiyama et al.

(10) Patent No.: US 7,065,341 B2
(45) Date of Patent: Jun. 20, 2006

(54) USER AUTHENTICATION APPARATUS, CONTROLLING METHOD THEREOF, AND NETWORK SYSTEM

(75) Inventors: Hiroyuki Kamiyama, Saitama (JP); Norio Ando, Yokohama (JP); Joohai Ch'ng, Kepala Batas (MY)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 220 days.

(21) Appl. No.: 10/416,620

(22) PCT Filed: Nov. 14, 2001

(86) PCT No.: PCT/JP01/09947

§ 371 (c)(1),
(2), (4) Date: Oct. 27, 2003

(87) PCT Pub. No.: WO02/41601

PCT Pub. Date: May 23, 2002

(65) Prior Publication Data

US 2004/0064730 A1  Apr. 1, 2004

(30) Foreign Application Priority Data

Nov. 16, 2000  (JP) .............................. 2000-350128

(51) Int. Cl.
*H04M 1/66* (2006.01)
*H04M 1/68* (2006.01)
*H04M 3/16* (2006.01)

(52) U.S. Cl. ................... 455/411; 455/410; 455/412.1; 455/412.2; 713/155; 713/168; 713/202

(58) Field of Classification Search ................ 455/410, 455/411, 412.1, 412.2, 413; 713/155, 168, 713/202
See application file for complete search history.

(56) References Cited

U.S. PATENT DOCUMENTS

| | | | |
|---|---|---|---|
| 6,058,311 A * | 5/2000 | Tsukagoshi | 455/435.1 |
| 6,549,773 B1 * | 4/2003 | Linden et al. | 455/426.1 |
| 6,587,684 B1 * | 7/2003 | Hsu et al. | 455/419 |
| 6,738,614 B1 * | 5/2004 | Blankenship et al. | 455/414.4 |
| 6,741,853 B1 * | 5/2004 | Jiang et al. | 455/418 |
| 2001/0054157 A1 | 12/2001 | Fukumoto | |
| 2002/0052912 A1 * | 5/2002 | Griswold et al. | 709/200 |
| 2004/0039843 A1 * | 2/2004 | Fuisz | 709/245 |
| 2005/0017068 A1 * | 1/2005 | Zalewski et al. | 235/380 |
| 2005/0033745 A1 * | 2/2005 | Wiener et al. | 707/10 |

FOREIGN PATENT DOCUMENTS

GB  2 341 523 A  3/2000
WO  WO 00/39678  7/2000

* cited by examiner

*Primary Examiner*—Curtis Kuntz
*Assistant Examiner*—Tuan Pham

(57) ABSTRACT

The object of the present invention is to provide a user authentication apparatus that is easy for the user of a mobile wireless communication terminal to use and that makes it possible to authenticate a user reliably, and to provide a method of controlling this apparatus. After authentication (S25) is performed based upon a user ID and password, e-mail that has been made to include a temporary URL that is valid for a fixed period of time is transmitted to a mobile station 11 (S30). The mobile station 11 is authenticated by determining (S32) whether it has accessed the temporary URL within the period of validity.

19 Claims, 7 Drawing Sheets

FIG. 3

From: www.mtas.xxx

Title: Verification of Registration Application

Body: This is your registration server for the xxx information service. Your application for registration has been received. If you are certain you wish to register, please access the following URL immediately:

http://www.mtas.xxx/user/aaa.html

Please note that this URL will become invalid in a few minutes.

JUMP                                        OPTION

FIG. 6

Mail To: aaa@mtas.xxx.jp

Title: Verification of Registration Application

Body: This is your registration server for the xxx information service. Your application for registration has been received. If you are certain you wish to register, please click the above mail address to make a transmission to us.

Please note that this mail address will become invalid in a few minutes.

OPTION

USER AUTHENTICATION APPARATUS, CONTROLLING METHOD THEREOF, AND NETWORK SYSTEM

TECHNICAL FIELD

This invention relates to a user authentication apparatus and controlling method thereof and, more particularly, to a user authentication apparatus and controlling method thereof for authenticating a mobile wireless communication terminal (mobile station) that has a data communication capability.

The invention relates further to a network system that uses a user authentication apparatus and controlling method thereof.

BACKGROUND ART

The widespread use of mobile wireless communication terminals such as cellular telephones and PHS (personal handy-phone system)-compliant telephones has been accompanied by the provision of many additional services besides the usual voice conversation service. Data communication services, such as e-mail service and Internet connection service, have become the focus of interest recently as examples of such additional services.

Using a data communication service makes possible data communication between a mobile wireless communication terminal and a computer network such as the Internet or an in-house intra-network. Web pages can be browsed and e-mails can be sent and received at a mobile wireless communication terminal using a browser application or mail application that has been installed in the mobile wireless communication terminal.

It is important for the so-called contents provider that provides such a mobile wireless communication terminal with information or services to validate the party to whom the information or services to be provided. Validation of the party is essential in a case where a charge is collected for provision of the information or service and in a case where the information or service is provided only to registered users.

Ordinarily, a mobile wireless communication terminal is assigned terminal-specific information, e.g., a subscriber number. Authentication of a party can be performed with ease if terminal-specific information is used. With the conventional mobile wireless communication systems, however, there are instances where such terminal-specific information is utilized only within the system and is not supplied to an external network such as a computer network.

In a case where a contents provider cannot acquire terminal-specific information, the user is allowed to enter a combination of a user ID, which is assigned to each registered user in advance, and a password that each registered user is allowed to set, and the user can be authenticated based upon a match with the registered particulars.

However, there is the danger that a user ID and password may become known to another person and even if they are entered from a completely different mobile wireless communication terminal, this cannot be distinguished. Accordingly, authentication based solely upon a user ID and password is undesirable in terms of reliability. In particular, since it is troublesome to enter an ID or password using the small keys on a mobile wireless communication terminal, the user tends to set an ID and password that are too simple and there is a greater possibility of surreptitious use in comparison with authentication by user IDs and passwords set ordinarily.

The present invention has been devised in view of the foregoing problem of the prior art and its object is to provide a user authentication apparatus that is easy for the user of a mobile wireless communication terminal to use and that makes it possible to authenticate a user reliably, and to provide a method of controlling this apparatus.

SUMMARY OF THE INVENTION

Specifically, the gist of the present invention is a user authentication apparatus for authenticating a mobile wireless communication terminal, characterized by having: address generating means for generating an address that is capable of being utilized by a mobile wireless communication terminal, this address making it possible for the user authentication apparatus to detect an access request or data transmission to this address; address notification means for notifying a mobile wireless communication terminal to be authenticated of the address that has been generated by the address generating means; detection means for detecting an access request or data transmission from the wireless communication terminal to be authenticated to the address of which notification has been given; and authentication means for authenticating the wireless communication terminal to be authenticated, based upon the access request or data transmission request detected by the detection means within a predetermined period of time.

The gist of the present invention according to another aspect thereof is a network system having the user authentication apparatus according to the present invention.

The gist of the present invention according to another aspect thereof is a method of controlling a user authentication apparatus for authenticating a mobile wireless communication terminal, characterized by having: an address generating step of generating an address that is capable of being utilized by a mobile wireless communication terminal, this address making it possible for the user authentication apparatus to detect an access request or data transmission to this address; an address notification step of notifying a mobile wireless communication terminal to be authenticated of the address that has been generated at the address generating step; a detection step of detecting an access request or data transmission from the wireless communication terminal to be authenticated to the address of which notification has been given; and an authentication step of authenticating the wireless communication terminal to be authenticated, based upon the access request or data transmission request detected at the detection step within a predetermined period of time.

BRIEF DESCRIPTION OF DRAWINGS

FIG. 3 is a diagram illustrating an example of e-mail transmitted from a user authentication apparatus 16 to a mobile station 11 in the first embodiment of the present invention;

FIG. 6 is a diagram illustrating an example of e-mail transmitted from the user authentication apparatus 16 to the mobile station 11 in the second embodiment of the present invention.

DETAILED DESCRIPTION OF THE INVENTION

FIRST EMBODIMENT

The present invention will now be described in detail on the basis of a preferred embodiment thereof with reference to the drawings.

Figure 1:
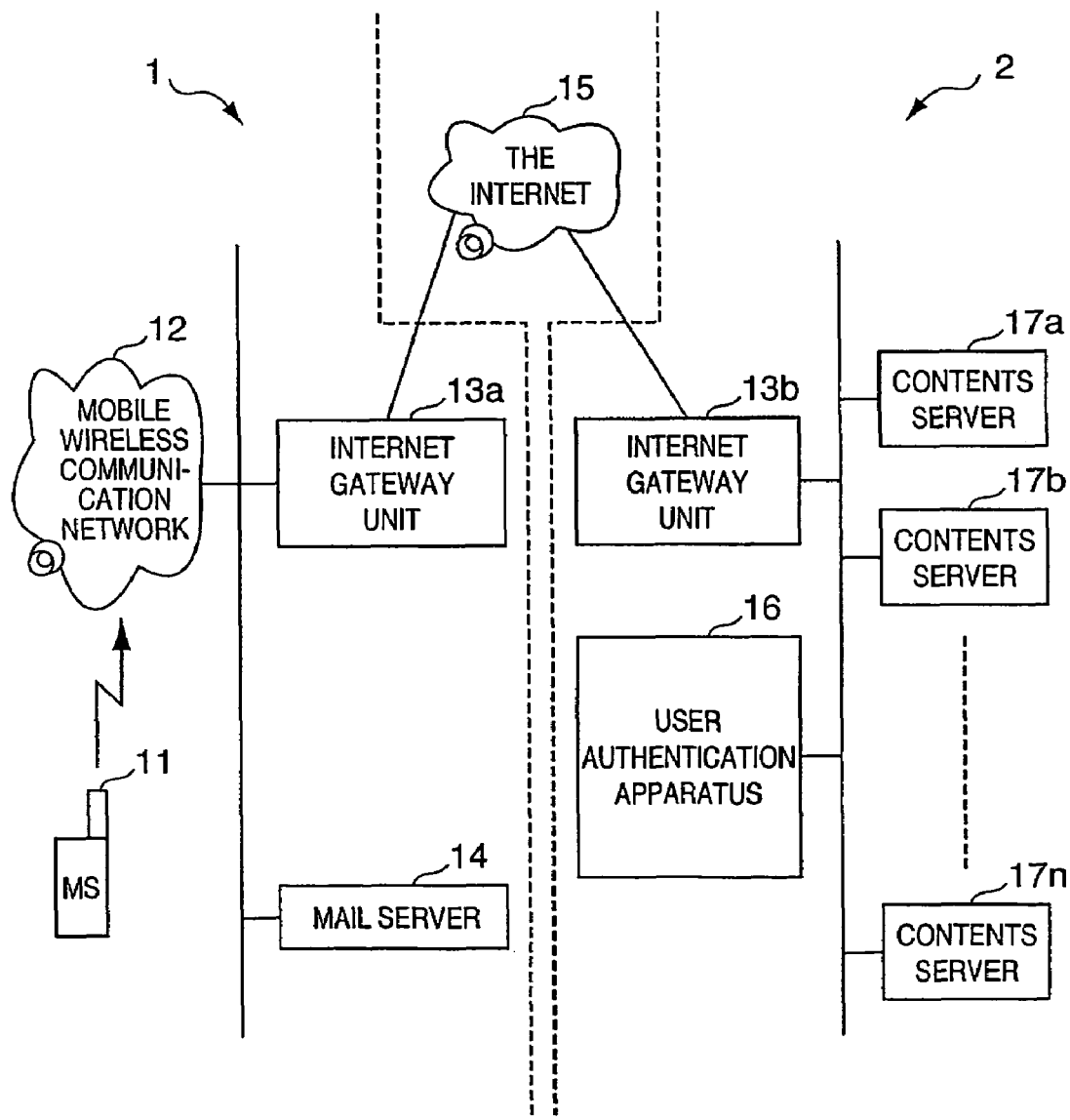
FIG. 1 is a block diagram illustrating an example of the structure of a network system that employs a user authentication apparatus according to an embodiment of the present invention.

FIG. 1 is a block diagram illustrating the overall structure of a network system 10 that employs a user authentication apparatus according to an embodiment of the present invention.

As shown in FIG. 1, the network system 10 comprises three networks, namely a mobile wireless communication system 1, an external network 2 and the Internet 15. In the configuration illustrated in this embodiment, the external network 2, which has a user authentication apparatus and a contents server, is connected to the mobile wireless communication system 1 via the Internet 15. However, any connection relationship will suffice so long as the external network 2 and mobile wireless communication system 1 are connected so as to be capable of communicating with each other.

In order to simplify the description, the arrangement is such that a user authentication apparatus 16 and contents servers 17a~17n that share the user authentication apparatus 16 belong to the same external network 2. However, if the user authentication apparatus 16 and contents servers 17a~17n are capable of communicating with each other, they need not necessarily belong to the same network. Further, it is unnecessary for the Internet 15 to be interposed between the mobile wireless communication system 1 and external network 2.

The mobile wireless communication system 1 has a mobile station (MS) 11, which is a mobile wireless terminal; a mobile wireless communication network 12 for providing the mobile station 11 with conversation and data communication services; an Internet gateway unit 13a for connecting the mobile wireless communication network 12 to the Internet 15; and a mail server 14 for managing e-mail sent to and received from the mobile station 11.

The mobile wireless communication network 12 includes a base station (BS) and a mobile-station control exchange (MSC) that are used conventionally in mobile wireless communication. Though only one mobile station 11 is shown in FIG. 1, a plurality of the mobile stations 11 exist for respective ones of service areas provided by a plurality of base stations included in the mobile wireless communication network 12.

The external network 2 has the contents servers 17a~17n for supplying the mobile station 11 with information and/or services of some kind, the user authentication apparatus 16 shared by the contents servers 17a~17n, and an Internet gateway unit 13b for connecting the external network 2 to the Internet 15.

It goes without saying that the contents servers 17a~17n may provide other computer devices (not shown) that belong to the external network 2 or computer devices (not shown) capable of accessing the external network 2 via the Internet 15 with information and/or services identical with those provided to the mobile station 11 belonging to the mobile wireless communication system 1.

The contents servers 17a~17n and mobile station 11 are capable of communicating with each other by any communication protocol. For example, communication is possible based upon the HTTP (HyperText Transfer Protocol), which uses mark-up language such as HTML or XML, etc., or based upon the WAP (Wireless Access Protocol).

The contents servers 17a~17n are so-called Web servers, which are capable of providing not only text and image information based upon HTML or the like, but also a variety of other information such as voice information and moving-picture information, etc. They are also capable of executing processing employing data entered by a user employing a CGI or the like. Well-known examples of such processing are on-line shopping, on-line banking and search processing using a search engine.

The user authentication apparatus 16 has:

1) a user database that stores information relating to registered users in regard to the contents servers 17a~17n that supply an authentication service;

2) a server function so that the mobile station 11 may execute processing relating to user registration, e.g., a Web server function similar to that of the contents servers 17a~17n;

3) a mail server function for sending and receiving e-mail;

4) a function for achieving mutual communication with the contents servers 17a~17n; and 5) a function for generating a temporary address used in user authentication and for performing user authentication based upon mail or an access request received from the mobile station 11.

The contents servers 17a~17n and user authentication apparatus 16 can be constructed by ordinary computers capable of being connected to a network (the external network 2 and Internet 15 in this embodiment). The processing and functions (described below) executed by these devices are implemented by executing the necessary programs by a CPU.

In the description rendered below, the procedure up to the connecting of the mobile station 11 to the Internet 15 via the Internet gateway unit 13a may be one employed generally. As the procedure does not have a direct bearing upon the present invention, a detailed description thereof is omitted.

(User Registration Processing)

User registration processing according to this embodiment will be described with reference to FIG. 2. In this embodiment, all information and services provided by the contents servers 17a~17n require a registration scheme; only users who have registered in advance (i.e., registered users) can utilize the contents servers 17a~17n. For this reason, the user of the mobile station 11 who desires to obtain information and services provided by the contents servers 17a~17n is required to perform user registration for the purpose of becoming a registered user of the desired contents servers.

In this embodiment, user registration and user authentication actually are carried out collectively by the user authentication apparatus 16 and not by the contents servers that provide the information and services. Performing user registration and authentication collectively by the user authentication apparatus 16 not only alleviates the load on the contents servers but also makes it possible to conserve hardware and software resources necessary for user registration and authentication required for each contents server.

Figure 2:
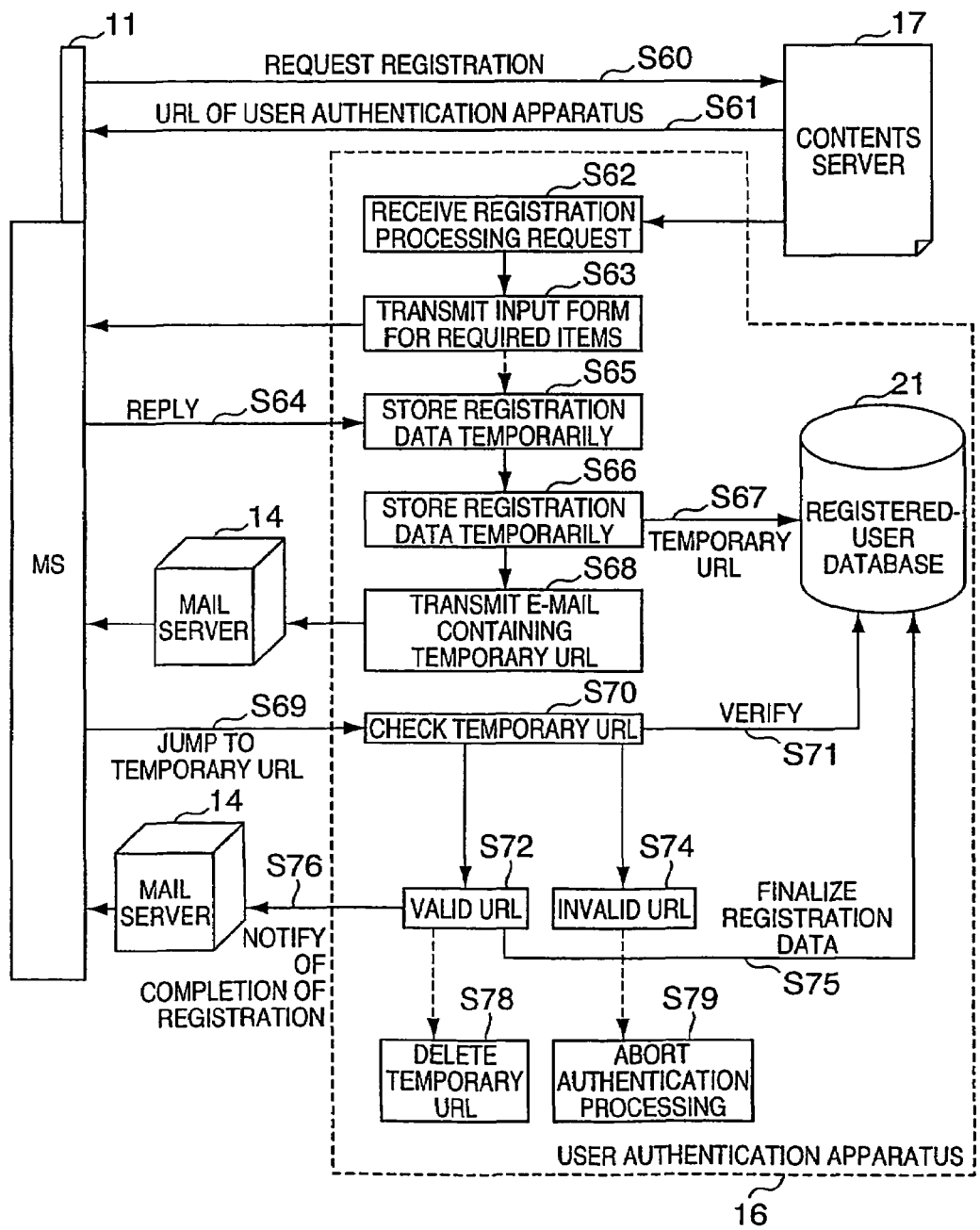
FIG. 2 is a flowchart for describing user registration processing in a first embodiment of the present invention.

FIG. 2 is a diagram useful in describing the flow of information exchanged in user registration processing according to this embodiment as well as the processing executed by the user authentication apparatus 16 and a contents server 17.

First, the mobile station 11 transmits a registration request to the contents server 17 (which is any one of the contents servers 17a~17n) (step S60). Upon receiving the registration request, the contents server sends the mobile station 11 screen display data, which includes a link (URL: Uniform Resource Locator) to the user authentication apparatus 16 and a message that prompts the user of the mobile station 11 to designate a jump to this link (step S61). Using the display on the mobile station 11, the user selects a user-registration start link, namely the link to the user authentication apparatus 16, and designates jump, whereupon user registration processing begins (step S62).

In this embodiment, user registration processing starts in a case where the mobile station 11 designates a jump to the user registration link included in the initial screen of the contents server 17, for example (the jump designation corresponds to a registration request). However, in a case where authentication has not been performed correctly in user authentication processing described later, the conditions for starting user registration processing can be set at will.

At step S62, the user authentication apparatus 16 is notified of the user registration request from the mobile station 11. Now the contents server 17 notifies the user authentication apparatus 16 of items requiring registration and of information specifying the contents server itself in order that the mobile station 11 may utilize the contents server 17.

Of course, the items necessary at the time of registration can be stored in a storage device (not shown) of the user authentication apparatus 16 beforehand in association with each contents server 17.

The user authentication apparatus 16 transmits data of a registration form, which has the items necessary for user registration, to the mobile station 11 instead of the contents server 17 (step 63). In this embodiment, it is assumed that the registration items are user ID, password, credit card number and its period of validity, subscriber number (the telephone number of the mobile station 11) and e-mail address. Among these, the credit card number and its period of validity are not necessarily required. Further, the e-mail address is that associated with the mobile station 11.

A display application incorporated in the mobile station 11 interprets the data of the received form and displays the result on the display of the mobile station 11. Using keys provided on the mobile station 11 or an externally mounted keyboard, the user enters the information required for each item and presses, e.g., a "SEND" key (or. a key to which an equivalent function has been assigned), to send the entered particulars back to the user authentication apparatus (step 64).

The user authentication apparatus 16 checks to see whether entered particulars received from the mobile station 11 contain any obvious errors (inclusion of a character in a subscriber number) and whether any entry items are inadequate and re-transmits the form in case of an error or inadequacy. It is possible at this time to transmit a form that allows only the required items to be entered again in case of error or the like or to transmit a form of the type in which only the items requiring re-entry are left blank while the other items retain the values that were filled in previously.

If there are no formal errors in the entered data, then the data is stored temporarily in a memory within the user authentication apparatus 16 in association with the information indicative of the contents server 17 (step S65). The user authentication apparatus 16 generates a temporary URL, associates this URL with the entered data stored temporarily in the memory and stores the data and the URL in a registered-user database 21 within the user authentication apparatus 16 (steps S66, S67).

E-mail in which the temporary URL generated at step S66 has been incorporated in the body of the mail is transmitted by the user authentication apparatus to the e-mail address registered by the user at step S64 (step S68).

The temporary URL will be described in greater detail. In this embodiment, the temporary URL generated by the user authentication apparatus 16 is used to authenticate whether registration has been performed by the user of the mobile station 11 himself. Basically, the temporary URL can take on any desired form so long as the temporary URL is an URL that has a domain name indicative of the user authentication apparatus 16 and is an URL that differs from other temporary URLs valid at the time of generation.

By way of example, if the domain name of the user authentication apparatus 16 is "www.mtas.xxx", then the temporary URL generated may be any URL that begins with "www.mtas.xxx". Specifically, it will suffice to generate an URL such as "www.mtas.xxx/user/aaa.html". In order to preclude accidental access by third parties, the term of validity of the temporary URL should be short but longer than the time required for a reply to be accepted from the mobile station 11. The term is five minutes at most and usually is on the order of two to three minutes. The number of temporary URLs that will be valid simultaneously, therefore, is equivalent to the number of users that will issue registration requests within the term of validity; the number will not be large. Therefore, the temporary URLs can be generated e.g., by replacing the "aaa" part in "www-.mtas.xxx/user/aaa.html" to another characters in alphabetical order such as "aab", "aac", "aad", . . . "aaz", "aba", . . . , or by generating a random number within a prescribed number of digits to replacing the "aaa" part.

The e-mail that includes the temporary URL is transmitted from the user authentication apparatus 16 in accordance with the so-called IP-packet format, and the mail reaches the mail server 14, which is included in the mobile wireless communication system 1, via the Internet gateway unit 13b, Internet 15 and Internet gateway unit 13a. The mail server 14 converts the received e-mail address to the subscriber number by using an address database (not shown) and transmits the arrival of new mail to the mobile station 11 via the mobile wireless communication network 12.

Upon being notified of arrival of new mail, the user of the mobile station 11 verifies the received mail with the mail server 14 and reads out the received mail. FIG. 3 illustrates an example of the e-mail transmitted from the user authentication apparatus 16. The user selects the temporary URL ("www.mtas.xxx/user/aaa.html") contained in the body of the mail and designates that a jump be made to this URL (i.e., requests the user authentication apparatus 16 for transmission of the file indicated by the temporary URL) (step S69).

This transmit request arrives at the user authentication apparatus 16 via the mobile wireless communication network 12, Internet gateway unit 13a, Internet 15 and Internet gateway unit 13b. The user authentication apparatus 16 looks up the URL of the received transmit request in the registered-user database 21 and determines whether it has been stored as a valid temporary URL (steps S70, S71). For example, this determination can be implemented by storing the time at which the temporary URL was stored at step S67 in the registered-user database 21 and deciding that the temporary URL is valid if the predetermined term of validity has not run out at lookup and deciding that it is invalid if the predetermined term of validity has run out at look-up.

Of course, it is possible to adopt an arrangement in which the user authentication apparatus 16 counts elapsed time from the moment the temporary URL is recorded at step S67 and deletes the temporary URL (and the associated registered information) at elapse of the effective term without performing look-up. In this case, if a temporary URL has been stored when look-up is performed at step S71, then this temporary URL can be judged to be valid. Judging the validity of a temporary URL may be performed by other methods if desired.

If the temporary URL is judged to be a valid (step S72) temporary URL as a result of authentication at step S70, e-mail that gives notification of the fact that registration is finished is transmitted to the mobile station 11 (step 76). The temporary URL is then deleted from the registered-user database 21 (step S78). In order to indicate that user information that has been stored in association with the deleted temporary URL is that of a formal registered user, a registration-complete flag is set or re-registration is made in a database that registers only formal registered users. If a temporary URL is invalid, on the other hand (step S74), registration processing is aborted and the registered particulars are deleted (step S79).

Mail notifying of completion of registration transmitted at step S76 is received by the mobile station 11 in the same manner as the above-mentioned mail notifying of the temporary URL. This completes registration processing. Though it is necessary to separately authenticate whether information relating to a credit card is correct, this authentication processing can be carried out by querying a server that implements the authentication of credit-card information, by way of example. Further, it is preferred that authentication of credit-card information be performed before registration processing is completed. For example., it is preferred that the credit-card information be authenticated before the transmission of the e-mail indicative of completion of registration after accessing of a valid temporary URL is verified at step S72.

In the event that credit-card information is erroneous or the card number is invalid, it will suffice for mail giving notification of the fact that registration is required again because of erroneous card information to be transmitted instead of the mail notifying of completion of registration. This would be followed by exiting registration processing.

(User Authentication Processing)

Figure 4:
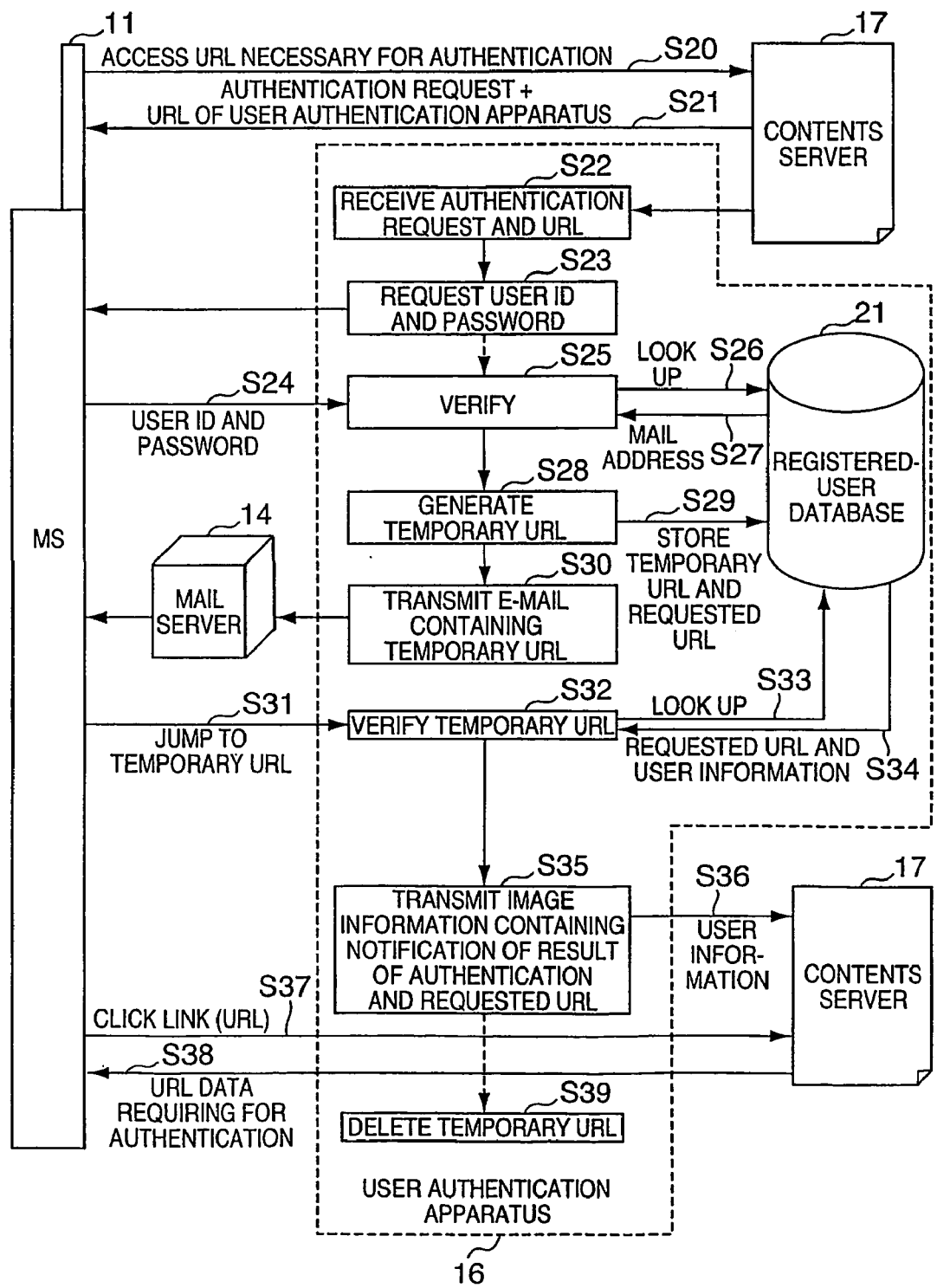
FIG. 4 is a flowchart for describing user authentication processing in the first embodiment of the present invention.

User authentication processing according to this embodiment will be described with reference to FIG. 4. The user authentication processing described below is executed under any conditions in dependence upon settings made by the contents server 17. For example, the processing is executed in a case where the mobile station 11 that accessed the contents server 17 requests information and service provided solely to a registered user, or more specifically, in a case where the user requests a jump to the page that provides this information and service. Of course, user authentication processing may be executed before the initial screen data of the contents server 17 is transmitted to the mobile station 11.

The following description relates to a case where the mobile station 11 that has accessed the contents server 17 designates a jump to a link that requires that the user be a registered user, with user authentication processing being executed in response to this designation.

First, at step S20, the user of the mobile station 11 selects the link (URL), which is displayed on, e.g., the initial screen of the contents server 17, to a screen that provides the service for the registered user, and then designates jump. When this is done, a request such as for transmission of a file corresponding to this URL is transmitted to the contents server 17.

Upon receiving this transmit request, the contents server 17 sends the mobile station 11 a message requesting user authentication (e.g., "THE DESIRED INFORMATION REQUIRES VALIDATION AS A REGISTERED USER WHO IS CAPABLE OF ACCESSING THIS INFORMATION. PLEASE ACQUIRE AUTHENTICATION BY JUMPING TO THE LINK SHOWN BELOW.") as well as display screen data that includes the link (URL) to the user authentication apparatus 16 (step S21). Further, the URL requested by the mobile station 11 is sent from the contents server 17 to the user authentication apparatus 16. The user of the mobile station 11 selects the link (URL) on the display screen and designates jump, whereby the user gains access to the site (user authentication screen) provided by the user authentication apparatus 16 (step S22).

Upon being accessed by the mobile station 11 (step S22), the user authentication apparatus 16 transmits screen data for entry of user ID and password to the mobile station 11 using the received access information of the mobile station 11 (step S23).

The user of the mobile station 11 enters the already registered user ID and password on the screen for entry of user ID and password displayed on the display unit of the terminal and designates transmit (step S24). The user authentication apparatus 16 refers to the registered-user database 21 using the received user ID and password as well as information indicative of the contents server 17 (this information can be specified from URL information received from the contents server 17 at step S62 at the time of registration) (steps S25, S26).

If the ID has been registered in the registered-user database 21 and the password corresponding to this ID also matches the entered password, then an e-mail address that has been registered in association with this user ID is read out (step S27). If the entered user ID has not been registered or if the entered password does not correspond to this ID, then a message giving notification of this fact is included in the screen data for entry of user ID and password, this screen data is transmitted to the mobile station 11 again and the processing of steps S24 to S27 is repeated.

An arrangement can be adopted in which if a correct input is not made a predetermined number of times (e.g., three) in succession, a message prompting re-registration is communicated to the user, authentication processing is exited and the contents server 17 is notified of the fact that authentication could not be achieved.

In a case where a user ID and password have been entered correctly, the user authentication apparatus 16 generates a valid temporary URL for a predetermined period of time (step S28). The generation of the temporary URL may be performed by a method similar to the above-described method implemented at the time of user registration processing. The generated temporary URL is stored temporarily in the registered-user database 21 in association with the URL that was acquired at step S22 (step S29).

Next, the user authentication apparatus 16 generates e-mail in the body of which the temporary URL generated at step S28 is included and transmits this e-mail to the e-mail address acquired at step S27 (step S30).

This e-mail is read out of the mail server 14 by the mobile station 11 in the same manner as that when user registration processing was executed. If the user of the mobile station 11 selects the temporary URL contained in the mail and designates jump, a transmit request to the temporary URL is transmitted (step S31).

The user authentication apparatus 16 looks up the registered-user database 21 to determine whether the temporary URL for which the transmit request was issued is valid or not (step S33). Whether the temporary URL is valid or not is judged in a manner similar to that when user registration processing was executed. If the temporary URL for which the transmit request was issued is valid, the registered-user information that has been stored in association therewith is transmitted to the contents server 17 (step S36). Screen display data which includes the URL accepted at step S22, i.e., the URL that is accessible only by a registered user, is transmitted to the mobile station 11 (step S35).

The user authentication apparatus 16 thenceforth deletes the temporary URL from the registered-user database 21 (step S39).

The contents server 17 transmits the prescribed data to the mobile station 11 using the registered-user information received from the user authentication apparatus 16 and the URL information transmitted by the mobile station 11 at step S37 (step S38). In this case, it is not required that the transmitted data be data (a file) corresponding to the URL for which the transmit request was issued by the user at step S20.

In this embodiment, the temporary URL has a format which specifies a file path within the user authentication apparatus 16. However, a file that corresponds to the temporary URL is not necessarily required. The reason for this is that the purpose of the temporary URL is to determine whether a registration request or a request for information and service is one that has been made by a user who intends to register or by a user who is registered; if it can be verified whether a request to access the temporary URL has been made within its period of validity, then the purpose of the temporary URL is attained.

Of course, a file corresponding to the temporary URL can actually be provided, and if an arrangement is adopted in which a file of authentication screen data for authentication by ID and password is made to correspond to the temporary URL and this file is transmitted, authentication can be performed with a higher degree of safety. In this case, if it is determined at step S33 that the temporary URL is valid, the authentication screen data corresponding to this temporary URL is transmitted to the mobile station 11 and authentication is carried out again just as at steps S24 to S26.

Thus, according to this embodiment, a temporary URL is issued and a user is authenticated based upon whether a transmit request has been made to this temporary URL subsequently within a predetermined period of time. As a result, it is possible to authenticate a user with a high degree of reliability without using the subscriber number of the mobile station 11.

Second Embodiment

In the first embodiment set forth above, user authentication is performed using a temporary URL that is valid for a predetermined period of time. As a consequence, it is possible for a number of unspecified third parties to access the temporary URL until the period of validity elapses following the issuance of the temporary URL. Accordingly, though it is very unlikely, there is the danger that the temporary URL may be accessed accidentally by a third party before the authorized registered user (or a user requesting registration) accesses the temporary URL.

In this embodiment, therefore, use is made of a temporary mail address to realize user authentication having a higher degree of reliability.

(User Registration Processing)

User registration processing according to this embodiment will be described with reference to FIG. 5. In this embodiment, as in the first embodiment, all information and services provided by the contents servers 17a~17n require a registration scheme; only users who have registered in advance (i.e., registered users) can utilize the contents servers 17a~17n. Further, the fact that user registration and user authentication are performed collectively by the user authentication apparatus 16 is the same as in the first embodiment. In addition, the conditions for starting user registration processing can be set at will just as in the first embodiment.

Figure 5:
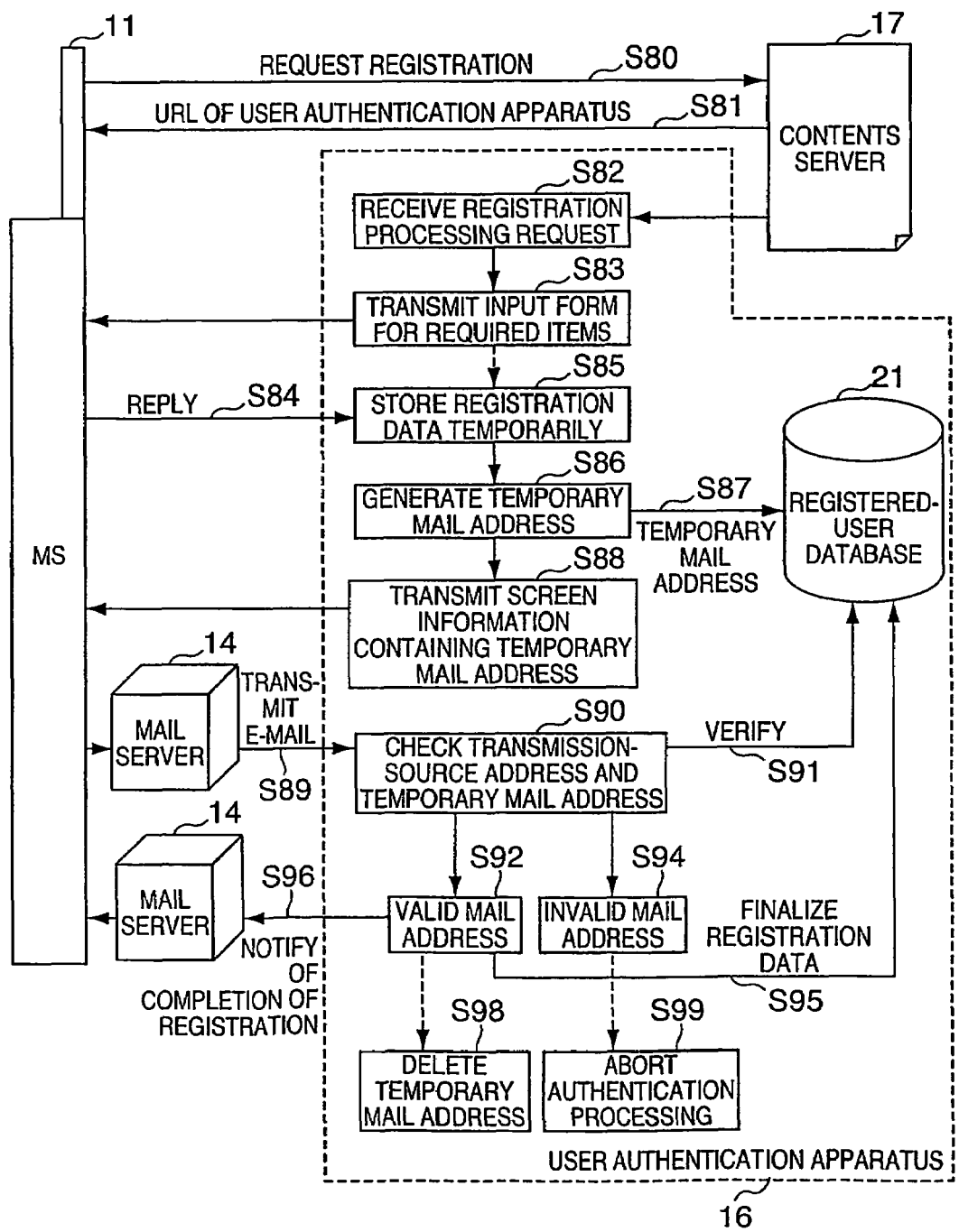
FIG. 5 is a flowchart for describing user registration processing in a second embodiment of the present invention.

FIG. 5 is a diagram useful in describing the flow of information exchanged in user registration processing according to this embodiment as well as the processing executed by the user authentication apparatus 16 and the contents server 17.

First, the mobile station 11 transmits a registration request to the contents server 17 (which is any one of the contents servers 17a~17n) (step S80). Upon receiving the registration request, the contents server sends the mobile station 11 screen display data, which includes a link (URL: Uniform Resource Locator) to the user authentication apparatus 16 and a message that prompts the user of the mobile station 11 to designate that a jump be made to this link (step S81). Using the display on the mobile station 11, the user selects a user-registration start link, namely the link to the user authentication apparatus 16, and designates jump, whereupon user registration processing begins (step S82).

At step S82, the user authentication apparatus 16 is notified of the user registration request from the mobile station 11. Now the contents server 17 notifies the user authentication apparatus 16 of items requiring registration and of information specifying the contents server itself in order that the mobile station 11 may utilize the contents server 17.

Of course, the items necessary at the time of registration can be stored in a storage device (not shown) of the user authentication apparatus 16 beforehand in association with each contents server 17.

The user authentication apparatus 16 transmits data of a registration form, which has the items necessary for user registration, to the mobile station 11 instead of the contents server 17 (step 83). In this embodiment, it is assumed that the registration items are user ID, password, credit card number and its period of validity, subscriber number (the telephone number of the mobile station 11) and e-mail address. Among these, the credit card number and its period of validity are not necessarily required.

Further, the e-mail address is that associated with the mobile station 11.

A display application incorporated in the mobile station 11 interprets the data of the received form and displays the result on the display of the mobile station 11. Using keys provided on the mobile station 11 or an externally mounted keyboard, the user enters the information required for each item and presses, e.g., a "SEND" key (or a key to which an equivalent function has been assigned), to send the entered particulars back to the user authentication apparatus (step 84).

The user authentication apparatus 16 checks to see whether entered particulars received from the mobile station 11 contain any obvious errors (inclusion of a character in a subscriber number) and whether any entry items are inadequate and re-transmits the form in case of an error or inadequacy. It is possible at this time to transmit a form that allows only the required items to be entered again in case of error or the like or to transmit a form of the type in which only the items requiring re-entry are left blank while the other items retain the values that were filled in previously.

If there are no formal errors in the entered data, then the data is stored temporarily in the memory within the user authentication apparatus 16 in association with the information indicative of the contents server 17 (step S85) The user authentication apparatus 16 generates a temporary mail address, associates this mail address with the entered data stored temporarily in the memory and stores the data and the mail address in the registered-user database 21 within the user authentication apparatus 16 (steps S86, S87).

The user authentication apparatus 16 transmits screen display data, which includes the temporary mail address generated at step S86, to the mobile station 11 (step 88).

The temporary mail address will be described in greater detail. In this embodiment, the temporary mail address generated by the user authentication apparatus 16 is used to authenticate whether registration has been performed by the user of the mobile station 11 himself. Basically, the temporary mail address can take on any desired form so long as the temporary mail address is a mail address that has a domain name indicative of the user authentication apparatus 16 and is a mail address that differs from other temporary mail addresses valid at the time of generation.

By way of example, if the domain name of the user authentication apparatus 16 is "mtas.xxx.jp", then the temporary mail address generated may be any mail address that ends with "mtas.xxx.jp". Specifically, it will suffice to generate a mail address such as "aaa@mtas.xxx.jp". The term of validity of the temporary mail address should be short but longer than the time required for a reply to be accepted from the mobile station 11. The term is five minutes at most and usually is on the order of two to three minutes. The number of temporary mail addresses that will be valid simultaneously, therefore, is equivalent to the number of users that will issue registration requests within the term of validity; the number will not be that high. Therefore, the temporary mail addresses can be generated e.g., by replacing the "aaa" part in "aaa@mtas.xxx.jp" to another characters in alphabetical order such as "aab", "aac", "aad", . . . , "aaz", "aba", . . . , or by generating a random number within a prescribed number of digits to replacing the "aaa" part.

This embodiment differs significantly from the first embodiment in that since e-mail for authentication purposes is sent back from the user, it is possible to perform user authentication by comparing the address of the transmission source of the e-mail that was sent back and the e-mail address entered at step S84. The meaning of setting the term of validity of the temporary mail address, therefore, is that the labor involved in generating and managing different temporary addresses simultaneously is eliminated.

Screen display data that includes the temporary mail address is transmitted from the user authentication apparatus 16 in accordance with the so-called IP-packet format and is sent to the mobile station 11 via the Internet gateway unit 13b, Internet 15, Internet gateway unit 13a and mobile wireless communication network 12.

FIG. 6 illustrates an example of the screen display data transmitted from the user authentication apparatus 16, wherein the data has been interpreted and displayed on the display unit by an application possessed by the mobile station 11. The user of the mobile station 11 selects the temporary mail address displayed on the screen, thereby transmitting mail (step S89).

The mail arrives at the user authentication apparatus 16 via the mobile wireless communication network 12, Internet gateway unit 13a, Internet 15 and Internet gateway unit 13b. The user authentication apparatus 16 uses the registered-user database 21 to determine whether the transmission-destination address of the received mail has been stored as an effective temporary mail address and whether the transmission-source address of the mail is the e-mail address that was entered at step S84 (steps S90, S91).

For example, the determination as to whether a temporary mail address is valid or invalid can be implemented by storing the time at which the temporary mail address was stored at step S87 in the registered-user database 21 and deciding that the temporary mail address is valid if the predetermined term of validity has not run out at look-up and deciding that it is invalid if the predetermined term of validity has run out at look-up.

Of course, it is possible to adopt an arrangement in which the user authentication apparatus 16 counts elapsed time from the moment the temporary mail address is recorded at step S87 and deletes the temporary mail address (and the associated registered information) at elapse of the period of validity without performing look-up. In this case, if a temporary mail address has been stored when look-up is performed at step S91, then this temporary mail address can be judged to be valid. Judging the validity of a temporary mail address may be performed by other methods if desired.

If as a result of the authentication at step S90 it is verified that the transmission-source address matches the address that was entered at step S84 and that it was transmitted to an effective temporary mail address (step S92), then e-mail that gives notification of the fact that registration is finished is transmitted to the mobile station 11 (step 96).

The temporary mail address is then deleted from the registered-user database 21 (step S98). In order to indicate that user information that has been stored in association with the deleted temporary mail address is that of a formal registered user, a registration-complete flag is set or re-registration is made in a database that registers only formal registered users. If a temporary mail address is invalid, on the other hand (step S94), registration processing is aborted and the registered particulars are deleted (step S99).

Mail notifying of completion of registration transmitted at step S96 is received by the mobile station 11 in the same manner as the above-mentioned mail from the temporary mail address. This completes registration processing. Though it is necessary to separately authenticate whether information relating to a credit card is correct, as in the first embodiment, this authentication processing can be carried out by querying a server that implements the authentication of credit-card information, by way of example. Further, it is preferred that authentication of credit-card information be performed before registration processing is completed. For example, it is preferred that the credit-card information be authenticated before the transmission of the e-mail indicative of completion of registration after transmission of mail from the address entered at step S84 to a valid temporary mail address is verified at step S92.

In the event that credit-card information is erroneous or the card number is invalid, it will suffice for mail giving notification of the fact that registration is required again because of erroneous card information to be transmitted instead of the mail notifying of completion of registration. This would be followed by exiting registration processing.

(User Authentication Processing)

Figure 7:
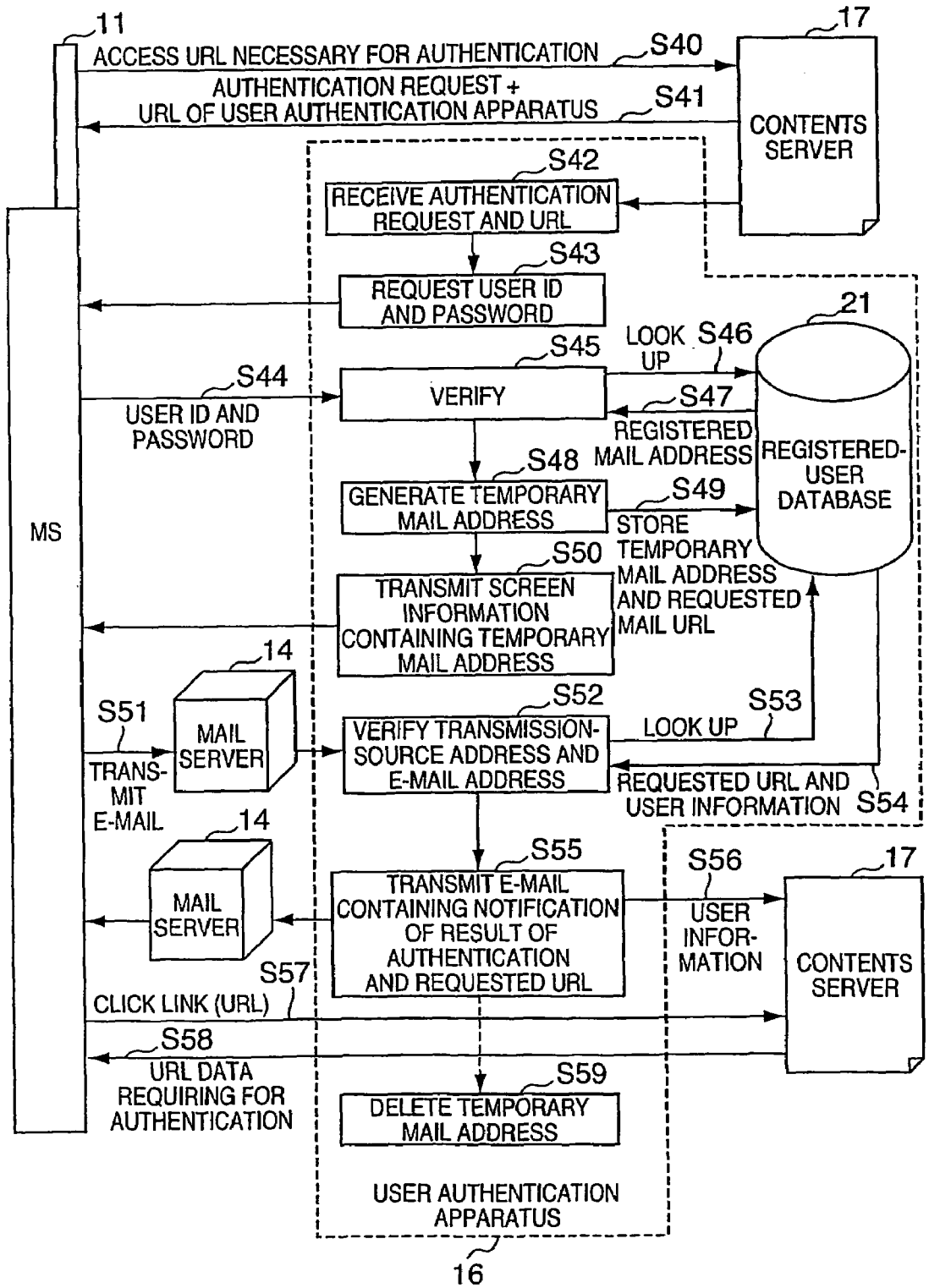
FIG. 7 is a flowchart for describing user authentication processing in the second embodiment of the present invention.

User authentication processing according to this embodiment will be described with reference to FIG. 7. In a manner similar to the user authentication processing according to the first embodiment, the user authentication processing is executed under any conditions in dependence upon settings made by the contents server 17.

The following description relates to a case where the mobile station 11 that has accessed the contents server 17 designates a jump to a link that requires that the user be a registered user, with user authentication processing being executed in response to this designation.

First, at step S40, the user of the mobile station 11 selects the link (URL), which is displayed on, e.g., the initial screen of the contents server 17, to a screen that provides the service for the registered user, and then designates jump. When this is done, a request such as for transmission of a file corresponding to this URL is transmitted to the contents server 17.

Upon receiving this transmit request, the contents server 17 sends the mobile station 11 a message requesting user authentication (e.g., "THE DESIRED INFORMATION REQUIRES VALIDATION AS A REGISTERED USER WHO IS CAPABLE OF ACCESSING THIS INFORMATION. PLEASE ACQUIRE AUTHENTICATION BY JUMPING TO THE LINK SHOWN BELOW.") as well as display screen data that includes the link (URL) to the user authentication apparatus 16 (step S41). Further, the URL requested by the mobile station 11 is sent to the user authentication apparatus 16. The user of the mobile station 11 selects the link (URL) on the display screen and designates jump, whereby the user gains access to the site (user authentication screen) provided by the user authentication apparatus 16 (step S42).

Upon receiving this information (step S42), the user authentication apparatus 16 transmits screen data for entry of user ID and password to the mobile station 11 using the received access information of the mobile station 11 (step S43).

The user of the mobile station 11 enters the already registered user ID and password on the screen for entry of user ID and password displayed on the display unit of the terminal and designates transmit (step S44). The user authentication apparatus 16 refers to the registered-user database 21 using the received user ID and password as well as information indicative of the contents server 17 (this information can be specified from URL information received from the contents server 17 at step S62 at the time of registration) (steps S45, S46).

If the ID has been registered in the registered-user database 21.and the password corresponding to this ID also matches the entered password, then an e-mail address that has been registered in association with this user ID is read out (step S47). If the entered user ID has not been registered or if the entered password does not correspond to this ID, then a message giving notification of this fact is included in the screen data for entry of user ID and password, this screen data is transmitted to the mobile station 11 again and the processing of steps S44 to S47 is repeated.

An arrangement can be adopted in which if a correct input is not made a predetermined number of times (e.g., three) in succession, a message prompting re-registration is communicated to the user, authentication processing is exited and the contents server 17 is notified of the fact that authentication could not be achieved.

In a case where a user ID and password have been entered correctly, the user authentication apparatus 16 generates a valid temporary mail address for a predetermined period of time (step S48). The generation of the temporary mail address may be performed by a method similar to the above-described method implemented at the time of user registration processing. The generated temporary mail address is stored temporarily in the registered-user database 21 in association with the URL that was acquired at step S42 (step S49).

Next, the user authentication apparatus 16 transmits screen display data, which contains the temporary mail address generated at step S48, to the mobile station 11 (step S50).

If the user of the mobile station 11 selects the temporary mail address displayed on the screen and designates transmit, e-mail is transmitted to the temporary mail address (step S51).

Using the transmission-source address and the transmission-destination address of the received e-mail, the user authentication apparatus 16 looks up the registered-user database 21 to determine whether the transmission-destination mail address is a valid temporary mail address and whether this temporary mail address is a reply from an associated e-mail address that has been registered (step S53).

Whether the temporary mail address is valid or not is judged in a manner similar to that when user registration processing was executed. If the temporary mail address for which the transmit request was issued is valid and the registered mail address associated with the temporary mail address matches the transmission-source address of the reply mail, the registered-user information that has been stored in association with the temporary mail address is transmitted to the contents server 17 (step S56). E-mail that includes the URL acquired at step S42, namely the URL that is accessible only by a registered user, is transmitted to the mail address authenticated at steps S52 to S54, namely to the mobile station 11 (step S55).

The user authentication apparatus 16 thenceforth deletes the temporary mail address from the registered-user database 21 (step S59).

The contents server 17 transmits the prescribed data to the mobile station 11 using the registered-user information received from the user authentication apparatus 16 and the URL information sent by the mobile station 11 at step S57 (step S58). In this case, it is not required that the transmitted data be data corresponding to the URL for which the transmit request was issued by the user at step S40.

Thus, in this embodiment, a temporary mail address is issued and a user is authenticated based upon whether reply mail has been transmitted to the temporary mail address, within a predetermined period of time, from an e-mail address entered at the time of registration. As a result, highly reliable user authentication is possible without using the subscriber number of the mobile station 11. Further, in this embodiment, user authentication is carried out using an e-mail address having a specificity similar to that of a subscriber number. This makes possible user authentication with greater certainty in comparison with the first embodiment.

OTHER EMBODIMENTS

In the foregoing embodiments, only a case in which the subscriber number of the mobile station 11 is not reported to the user authentication apparatus 16 (is not acquired by the user authentication apparatus 16) is described. However, the present invention is applicable also to a case where notification of the subscriber number of the mobile station 11 is given. In this case it is possible to achieve user authentication with higher reliability.

In the foregoing embodiments, a temporary URL and a temporary mail address both have a short term of validity. As a result, if the user of the mobile station 11 wishes to cancel registration processing or an access request, the user need only refrain from replying. However, it is possible to adopt an arrangement in which cancellation is designated more explicitly.

In such case, in the first embodiment, a temporary URL (processing-abort temporary URL) for specifying cancellation of registration processing or cancellation of an access request would be issued in addition to the above-mentioned temporary URL, and e-mail containing both temporary URLs would be transmitted. In a case where a request to transmit the processing-abort temporary URL is detected within the term of validity, it would suffice to terminate access request processing or registration processing.

In the second embodiment, on the other hand, a temporary mail address (processing-abort temporary mail address) for specifying cancellation of registration processing or cancellation of an access request would be issued in addition to the above-mentioned temporary mail address, and screen display data containing the processing-abort temporary mail address in the body thereof would be transmitted. In a case where reception of e-mail from a predetermined transmission-source address is detected within the term of validity of the processing-abort temporary mail address, it would suffice to terminate registration processing or access request processing.

In accordance with the present invention, as described above, an effect obtained is that it is possible to authenticate a mobile wireless communication terminal without using the subscriber number of the mobile wireless communication terminal.

The invention claimed is:

1. A user authentication apparatus for authenticating a mobile wireless communication terminal wherein in response to said mobile wireless communication terminal attempting to access a particular content server, said content server instructing said mobile wireless communication terminal to first perform authentication with said user authentication apparatus, said user authentication apparatus comprising:
   address generating means for generating an URL address that is capable of being utilized by said mobile wireless communication terminal in response said mobile wireless communicating terminal attempting to access said content server, said URL address making it possible for said user authentication apparatus to detect an access request or data transmission to this URL address;
   address notification means for notifying said mobile wireless communication terminal to be authenticated of the URL address that has been generated by said address generating means;
   detection means for detecting an access request or data transmission from the wireless communication terminal to be authenticated to the URL address of which notification has been given; and
   authentication means for authenticating the wireless communication terminal to be authenticated, based upon the access request or data transmission request detected by said detection means within a predetermined period of time wherein said authentication means further assigns a user id and password for subsequently authorizing access from said wireless communication terminal to said content server.

2. A user authentication apparatus according to claim 1, wherein the URL address generated by said address generating means differs for each mobile wireless communication terminal that is to be authenticated and has a period of validity decided in advance.

3. A user authentication apparatus according to claim 1, wherein said address generating means gives notification of said URL address by e-mail.

4. A user authentication apparatus according to claim 3, wherein said authentication means performs said authentication by taking into consideration a transmission-source address of e-mail that has been transmitted from the mobile wireless communication terminal that is to be authenticated to the address of which notification has been given by said address notification means.

5. A user authentication apparatus according to claim 1 wherein said URL address is an address indicating a file within said user authentication apparatus.

6. A user authentication apparatus according to claim 1, wherein said URL address is an e-mail address that is capable of being received by said user authentication apparatus.

7. A user authentication apparatus according to claim 1, further comprising a user database means storing information relating to mobile wireless communication terminals that have already been registered.

8. A method of controlling a user authentication apparatus for authenticating a mobile wireless communication terminal wherein in response to said mobile wireless communication terminal attempting to access a particular content server, said content server instructing said mobile wireless communication terminal to first perform authentication with said user authentication apparatus, comprising the steps of:
   generating an URL address that is capable of being utilized by said mobile wireless communication terminal in response to said mobile wireless communication terminal attempting to access said content server this URL address making it possible for said user authentication apparatus to detect an access request or data transmission to this URL address;
   notifying said mobile wireless communication terminal to be authenticated of the URL address that has been generated at said address generating step;
   detecting an access request or data transmission from the wireless communication terminal to be authenticated to the URL address of which notification has been given; and
   authenticating the wireless communication terminal to be authenticated, based upon the access request or data transmission request detected within a predetermined period of time wherein said step of authenticating further assigns a user id and password for subsequently authorizing access from said wireless communication terminal to said content server.

9. A method of controlling a user authentication apparatus according to claim 8, wherein the URL address generated at said address generating step differs for each mobile wireless communication terminal that is to be authenticated and has a period of validity decided in advance.

10. A method of controlling a user authentication apparatus according to claim 8, wherein said address generating step gives notification of said URL address by e-mail.

11. A method of controlling a user authentication apparatus according to claim 8, wherein said URL address is an address indicating a file within said user authentication apparatus.

12. A method of controlling a user authentication apparatus according to claim 8, wherein said URL address is an e-mail address that is capable of being received by said user authentication apparatus.

13. A method of controlling a user authentication apparatus according to claim 12, wherein said authentication step performs said authentication by taking into consideration a transmission-source address of e-mail that has been transmitted from the mobile wireless communication terminal that is to be authenticated to the address of which notification has been given at said address notification step.

14. A method of controlling a user authentication apparatus of claim 8, wherein the address is a temporary URL address associated with the user authentication apparatus.

15. A method for authenticating a mobile wireless terminal requesting access to a particular content server, said mobile wireless terminal being served by a wireless network and said content server is communicably connected to said wireless network for providing particular content or service to said mobile wireless terminal, comprising the steps of:

receiving an authentication request from said mobile wireless terminal to access said content server, wherein said authentication request includes data identifying said mobile wireless terminal and wherein said authentication request is received by an authentication server associated with said content server;

verifying by said authentication server whether said mobile wireless terminal is a valid user previously registered with and authorized to access said content server, said step of verifying further comprises the steps of receiving user id and password from said mobile wireless terminal and comparing said received user id and password against previously stored user id and password;

creating by said authentication server a temporary URL address for said mobile wireless terminal;

communicating said temporary URL address from said authentication server to said mobile wireless terminal;

determining whether said mobile wireless terminal has accessed said temporary URL address within a predetermined time period;

in response to determining that said mobile wireless terminal has accessed said temporary URL address, allowing said mobile wireless terminal to directly access said content server.

16. The method of claim 15, wherein said temporary URL, address created differs for each mobile wireless terminal that is to be authenticated.

17. The method of claim 15, wherein said temporary URL address is communicated by an email to said mobile wireless terminal.

18. The method of claim 15, wherein said temporary URL address is communicated by a Short Message System (SMS) to said mobile wireless terminal.

19. The method of claim 15, wherein said temporary URL address is a temporary email address that will remain accessible for a particular period of time.

* * * * *